(12) United States Patent
Landau et al.

(10) Patent No.: US 12,367,731 B2
(45) Date of Patent: Jul. 22, 2025

(54) ELECTRIC PORTION CONTROLLED DRY FOOD DISPENSER

(71) Applicants: Ofer Landau, Ein Vered (IL); Ido Landau, Raanana (IL)

(72) Inventors: Ofer Landau, Ein Vered (IL); Ido Landau, Raanana (IL)

(*) Notice: Subject to any disclaimer, the term of this patent is extended or adjusted under 35 U.S.C. 154(b) by 808 days.

(21) Appl. No.: 17/533,140

(22) Filed: Nov. 23, 2021

(65) Prior Publication Data
US 2022/0180690 A1 Jun. 9, 2022

Related U.S. Application Data

(60) Provisional application No. 63/122,498, filed on Dec. 8, 2020.

(51) Int. Cl.
| | |
|---|---|
| G07F 11/62 | (2006.01) |
| A47G 19/34 | (2006.01) |
| B65D 83/06 | (2006.01) |
| G06K 7/14 | (2006.01) |
| H04N 7/18 | (2006.01) |

(52) U.S. Cl.
CPC ............ *G07F 11/62* (2013.01); *A47G 19/34* (2013.01); *B65D 83/06* (2013.01); *G06K 7/1413* (2013.01); *G06K 7/1417* (2013.01); *H04N 7/18* (2013.01)

(58) Field of Classification Search
CPC .......... B65D 83/06; A47J 47/01; A47G 19/34
See application file for complete search history.

(56) References Cited

U.S. PATENT DOCUMENTS 5,230,300 A * 7/1993 Mezhinsky .......... A01K 5/0275
                                                           119/51.11
5,466,894 A * 11/1995 Naef .......................... B65B 1/28
                                                           177/160
(Continued)

FOREIGN PATENT DOCUMENTS

| CA | 2973161 A1 | 2/2015 |
| CN | 111528716 A | 8/2020 |

(Continued)

OTHER PUBLICATIONS

Design U.S. Appl. No. 29/809,912, filed on titled Electric Food Dispenser filed Sep. 30, 2021.
(Continued)

*Primary Examiner* — Timothy L Maust

(57) ABSTRACT

Some embodiments of the current invention relate to an automatic and/or sanitary dry goods dispenser. Optionally, a manual dispenser may be upgraded for automatic dispensing. For example, a motor optionally opens and/or closes a dispensing valve fully and/or partially. For example, the opening and closing may be adjusted to achieve a desired flow rate and/or dispensing volume. Optionally, the device may include a valve biased to a closed configuration. Optionally, a motor that opens the valve for a fixed time and/or for as long as a switch remains in an activated and/or oscillates the valve. Additionally or alternatively, a manual operation option is available. In some embodiments, the opening and/or closing may be preprogrammed. For example, a user will purchase goods and/or a program will be transferred to the dispenser according to his purchase.

12 Claims, 18 Drawing Sheets

(56) References Cited

U.S. PATENT DOCUMENTS

| | | | |
|---|---|---|---|
| 5,738,153 A * | 4/1998 | Gerling | A01M 7/0092 |
| | | | 141/192 |
| 5,947,336 A | 9/1999 | Thompson | |
| 6,367,417 B1 * | 4/2002 | Gal | A01K 5/0283 |
| | | | 119/51.5 |
| 6,622,655 B2 * | 9/2003 | Springett | A01K 61/85 |
| | | | 119/51.01 |
| 8,584,714 B2 * | 11/2013 | Gaultney | B01F 35/881 |
| | | | 222/77 |
| 9,549,640 B2 * | 1/2017 | Landau | A47J 47/04 |
| 2008/0190964 A1 | 8/2008 | Ben Shlomo et al. | |
| 2014/0131384 A1 | 5/2014 | Martinez | |
| 2020/0193758 A1 | 6/2020 | Conway | |

FOREIGN PATENT DOCUMENTS

| | | |
|---|---|---|
| EP | 2294948 A1 | 3/2011 |
| JP | 2003116393 A | 4/2003 |

OTHER PUBLICATIONS

European Design Application No. 008710834-0001, filed on Sep. 30, 2021.

* cited by examiner

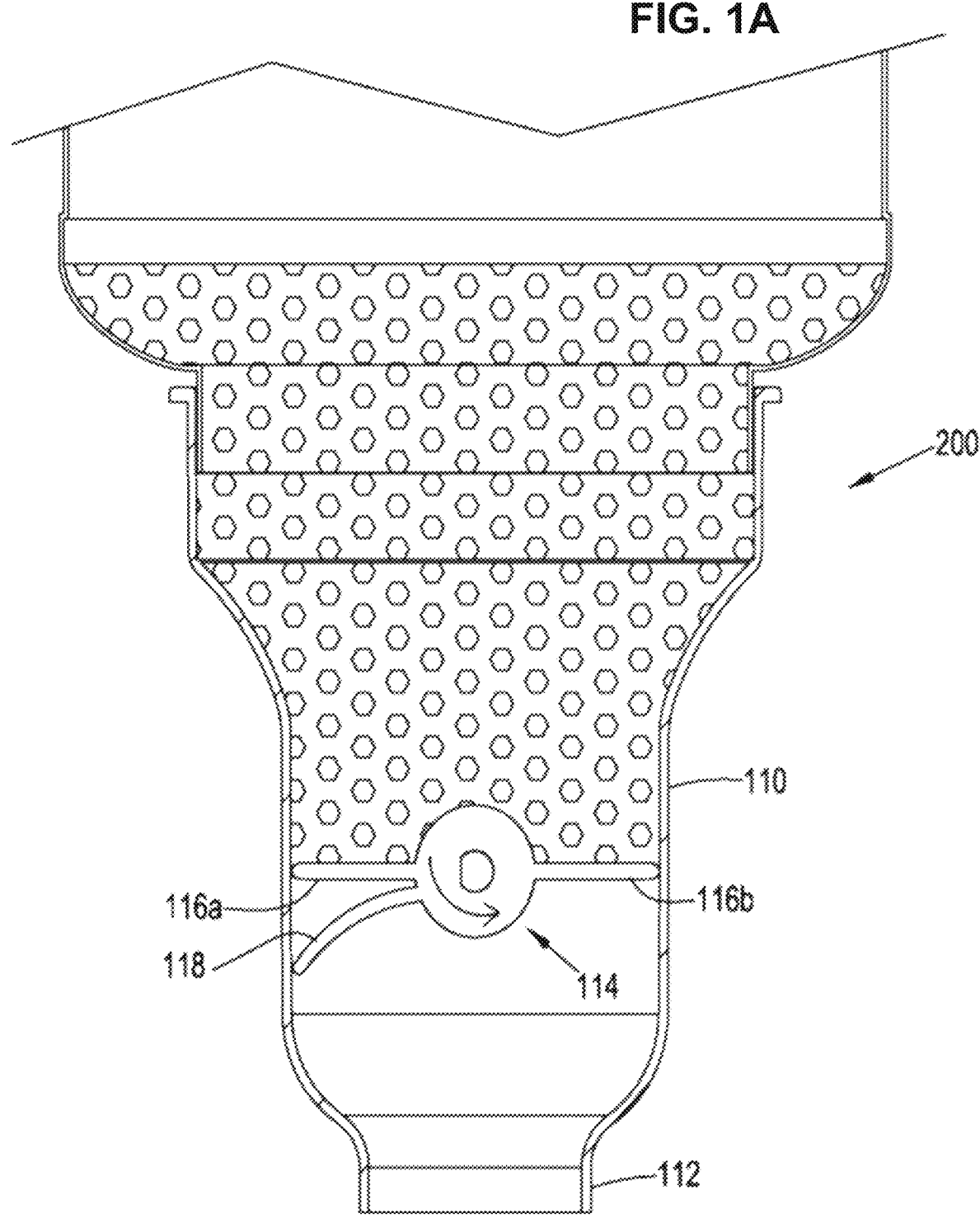

_ELECTRIC PORTION CONTROLLED DRY FOOD DISPENSER_

RELATED APPLICATION/S

This application claims the benefit of priority under 35 USC § 119(e) of U.S. Provisional Patent Application No. 63/122,498 filed 8 Dec. 2020, the contents of which are incorporated herein by reference in their entirety.

FIELD AND BACKGROUND OF THE INVENTION

The present invention, in some embodiments thereof, relates to an automatic dry goods dispenser and, more particularly, but not exclusively, to a dispenser that dispenses dry goods cleanly, without crushing the product and/or without hand contact.

U.S. Pat. No. 9,549,640 to the current inventor appears to disclose, "A dry food dispensing device for controlling the portion size of the dispensed food, comprising a storage receptacle for containing dry foods, wherein the receptacle is seated over a base providing a housing for a dispensing mechanism, the dispensing mechanism comprising:

a turnable free flow valve having wings, capable of rotation to an opening angle defined by a position limiter; and a depressible handle for controlling the free flow valve via the position limiter, wherein the dispensing mechanism releases a portion of the dry food, with the portion being determined by a user as a function of time the turnable free flow valve is held at the opening angle."

European Patent Application Publication no. EP2294948 appears to disclose, "A dispensing actuator locking assembly for a bulk inventory dispenser. The dispenser includes a housing, a lockable dispensing actuator pivotally connected to the housing, and a gate connected to the dispensing actuator and adapted to pivot between a closed position and an open position to selectively dispense the bulk product through an opening in the housing when the dispensing actuator is in an unlocked condition. The dispensing actuator cannot be accidentally actuated unless and until the locking assembly is purposefully disengaged by the user of the dispenser."

US Patent Application Publication no. US20080190964 appears to disclose, "A device is provided for holding dispensing and conveying substances such as dry foods such as, for example, flour, breakfast cereal or granola. The device may include a stand holding a possibly hermetically sealed container which may include a conveyor, having a flexible paddle belt mounted on at least two axles and possibly at least one connector. The conveyor is connected to a handle which when rotated may cause the conveyor to rotate and dispense the dry substances such as food from the container into, for example, an outside bowl."

U.S. Pat. No. 5,947,336 appears to disclose, "A dry food dispenser having a cylindrical container with a removable top or cap for covering a central storage area holding dry baby formula or other dry food commodity. The mid-section of the container includes a tapered funnel terminating in an opening. A rotatable cylinder is operably carried on the funnel having a pre-measured receptacle or cavity co-extensive with the funnel opening for collecting a quantity of the dry food product. Upon rotation of the cylinder, the receptacle carries the product from the funnel for external dispensing into a utility container for usage. A second pre-measured receptacle or cavity may be provided in the cylinder and a releasable retainer interconnects the container with the cylinder for holding the cylinder in a fixed position."

U.S. Pat. No. 5,230,300 appears to disclose, "An automatic dry food feeder for animals is described. The feeder consists of a housing with a hopper fitted in the housing having sloping members terminating in a rectangular section at the bottom of the hopper. An electric motor having a gearbox attached thereto is located outside the rectangular portion of the hopper. The gearbox shaft extends into the rectangular portion with a sleeve fitted over the shaft. Attached to the sleeve are segmented flexible vanes that rotate in accordance with the signal provided by an electronic programmable controller. Rotating the segmented flexible vanes a prescribed amount in response to a programmed timer dispenses a measured amount of dry animal food into a tray."

SUMMARY OF THE INVENTION

According to an aspect of some embodiments of the invention, there is provided a system to dispense dry goods including: a receptacle for the dry goods; a spout for dispensing the dry goods via gravity flow from the receptacle; a valve between the receptacle and the spout controlling flow of the dry goods from the receptacle; an actuator driving the valve between open and closed states; a controller configured to command the actuator to open and close the valve according to a program; and an activator for the controller.

According to some embodiments of the invention, the flow is a free flow valve.

According to some embodiments of the invention, the system where the activator is a sanitary activator.

According to some embodiments of the invention, the system further includes: an adjustment interface for adjusting the program.

According to some embodiments of the invention, the adjustment interface includes a wireless receiver.

According to some embodiments of the invention, the adjustment interface includes an application running on a personal computing device.

According to some embodiments of the invention, the adjustment interface includes a manual regulator to adjust a maximum opening position.

According to some embodiments of the invention, the adjustment interface includes a manual regulator to adjust an oscillation rate between a maximum open position and a minimum opening position.

According to some embodiments of the invention, the adjustment interface includes a manual regulator to adjust an open time.

According to some embodiments of the invention, the adjustment interface includes an interface configured for inputting characteristics of the dry goods and an algorithm for deciding on a program for dispersing the dry goods.

According to some embodiments of the invention, the interface is configured for inputting characteristics includes a camera for taking an image of the dry goods.

According to some embodiments of the invention, the interface includes an image processing component for determining a shape and size of the dry goods from the image.

According to some embodiments of the invention, the receptacle includes a fiducial marker.

According to some embodiments of the invention, the system further includes a manual lever for activating dispensing manually.

According to some embodiments of the invention, the system further includes an optical reader for reading a code specifying the program.

According to an aspect of some embodiments of the invention, there is provided a method for dispensing thy goods including: supplying an automatic dry goods dispenser with a receptacle for the dry goods, a sanitary activator, a spout through which the dry goods pass, a valve between the receptacle and the spout and a motor responsive to the activator and driving the valve; placing a container under the spout; activating the motor via the sanitary activator; and driving the valve with the motor to facilitate passing of the dry goods through the spout into the container.

According to some embodiments of the invention, the driving includes oscillating the valve between an open and closed position.

According to some embodiments of the invention, the method further includes adjusting a rate of the oscillating to avoid crushing the dry goods.

According to some embodiments of the invention, the driving is according a program and further including reading the program from a visual code.

According to some embodiments of the invention, the driving is according a program and wherein the program is configured to dispense a predefined quantity of the dry goods.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A, 1B and 2 illustrated a valve of a previous art dry goods dispenser from US Patent FIG. U.S. Pat. No. 9,549,640 to the current inventor;

Figure 1B:
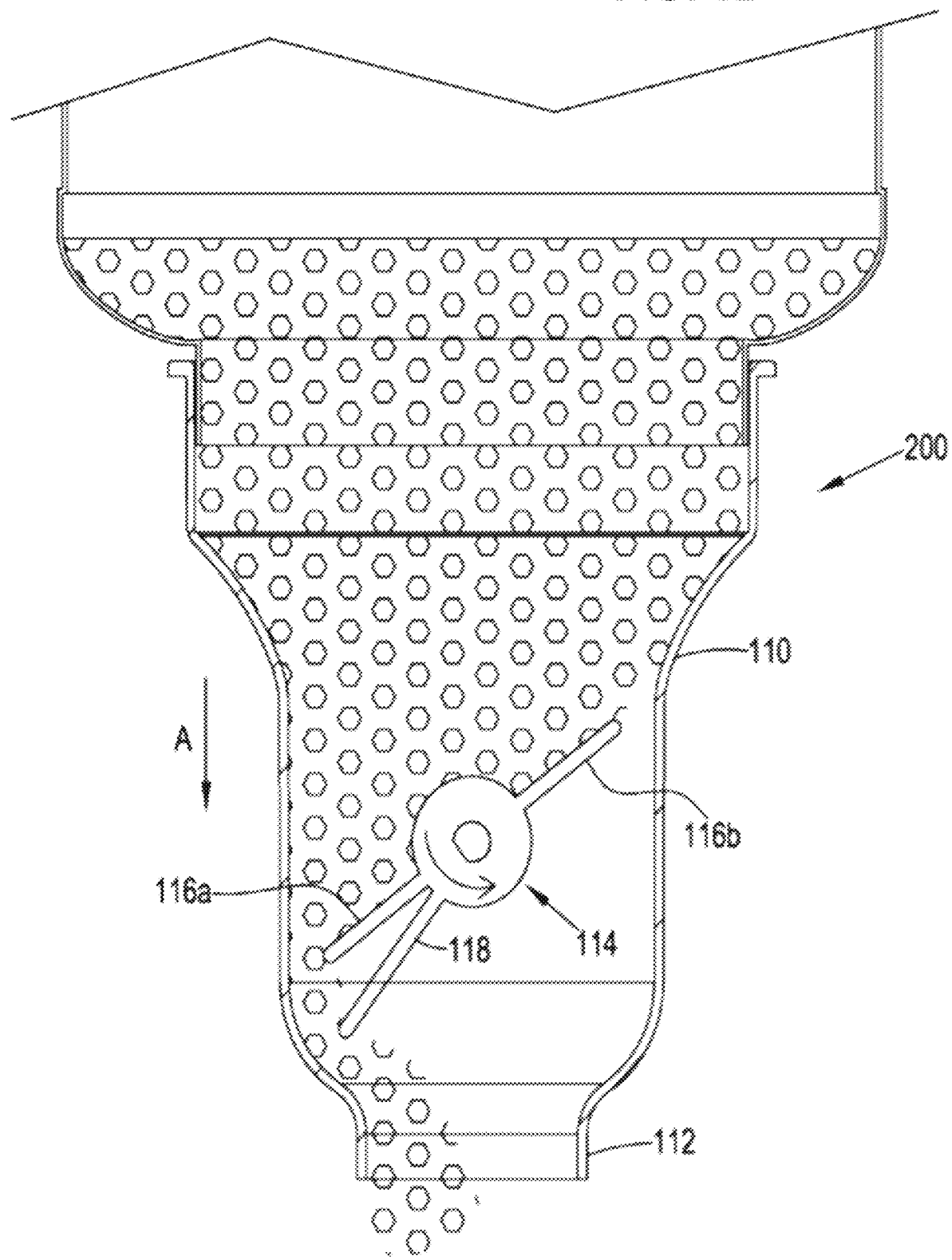

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) and/or a mesh network (meshnet, emesh) and/or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks might be expected to use completely different methods, e.g., making use of expert knowledge and/or the pattern recognition capabilities of the human brain, which would be vastly more efficient than manually going through the steps of the methods described herein.

Data and/or program code may be accessed and/or shared over a network, for example the Internet. For example, data may be shared and/or accessed using a social network. A processor may include remote processing capabilities for example available over a network (e.g., the Internet). For example, resources may be accessed via cloud computing. The term "cloud computing" refers to the use of computational resources that are available remotely over a public network, such as the internet, and that may be provided for example at a low cost and/or on an hourly basis. Any virtual or physical computer that is in electronic communication with such a public network could potentially be available as a computational resource. To provide computational resources via the cloud network on a secure basis, computers that access the cloud network may employ standard security encryption protocols such as SSL and PUP, which are well known in the industry.

DESCRIPTION OF SPECIFIC EMBODIMENTS OF THE INVENTION

The present invention, in some embodiments thereof, relates to an automatic dry goods dispenser and, more particularly, but not exclusively, to a dispenser that dispenses dry goods cleanly, without crushing the product and/or without hand contact.

Figure 2:
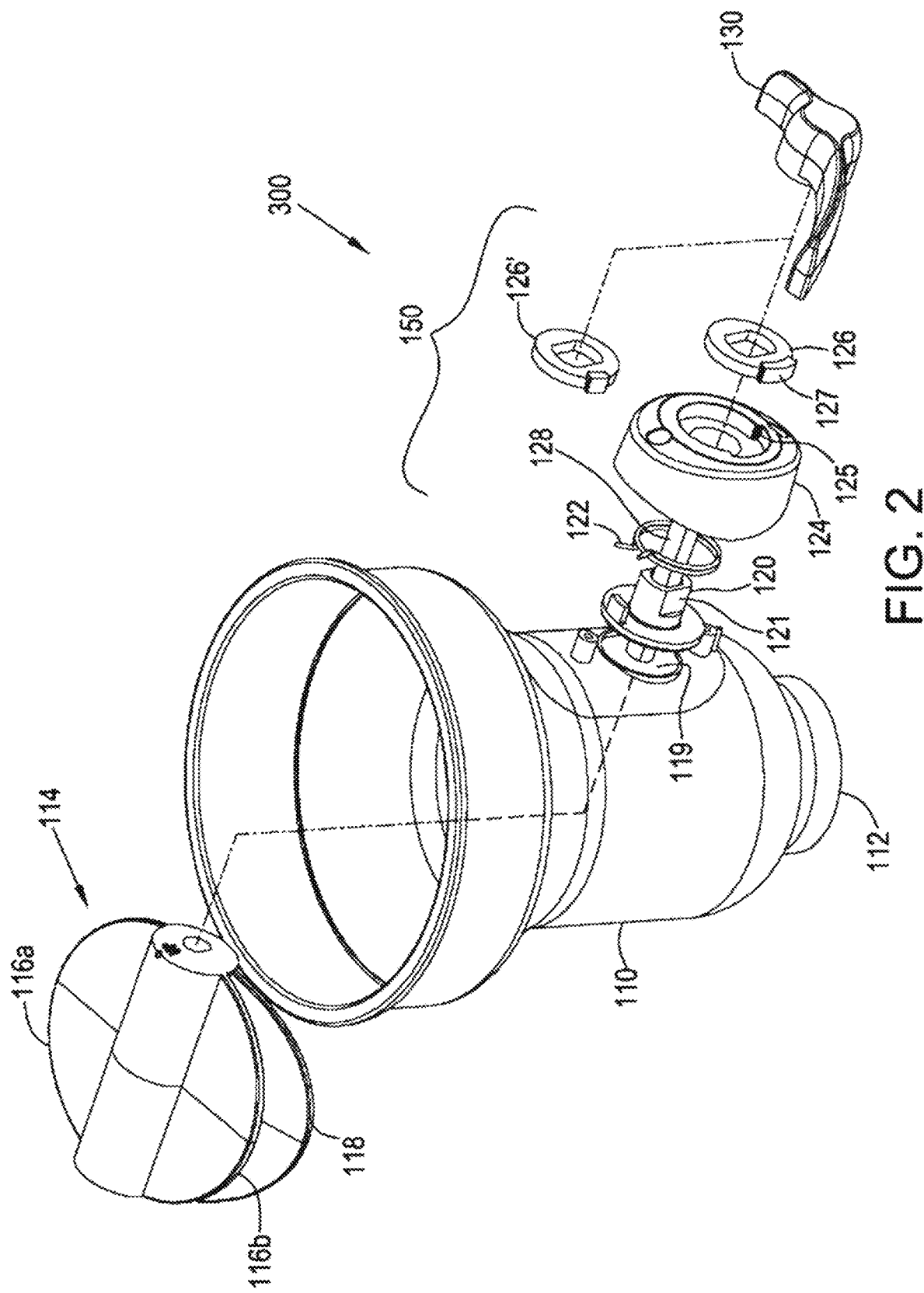

For purposes of better understanding some embodiments of the present invention, as illustrated in FIGS. 3 to 11 of the drawings, reference is first made to the construction and operation of a valve of a manual dry goods dispenser as illustrated in FIGS. 1A, 1B and 2.

FIGS. 1A, 1B and 2 illustrated a valve of a previous art dry goods dispenser from US Patent FIG. U.S. Pat. No. 9,549,640 to the current inventor, 1A shows valve 114 in a leveled position, having wings 116 *a-b* blocking the stored food from exiting dispenser 200.

FIG. 1B shows valve 114 tilted counter-clockwise, such that wings 116 *a-b* are no longer blocking the food, and as shown by arrow A, the food is now allowed to bypass valve 114 in order to flow through dispensing aperture 112, to the user.

The overall product design for the inventive dispenser can be such that a simply constructed, easy-to-use dispenser is provided, featuring an adjustable valve 114 opening angle, to accommodate different types of dry food, whether they be in fine or coarse granular form, flakes or chunky-type food pieces, including toppings, powders and the like.

Referring now to FIG. 2, there is shown a perspective exploded view of free-flow dispenser 200, showing optional components.

Depressible handle 130 and valve 114 are connected via handle actuator 150 having a square shaft 128 inserted into each of its components (described below). Each of the ends of shaft 128 are inserted into one of handle 130 or valve 114, so that when depressing handle 130, valve 114 turns. Valve 114 has two identical rounded wings 116 *a-b* disposed on each side of valve 114 in the same plane, such that they fit into the internal circumference of base 110, and when maintained at a level position, they block the exit of the stored dry food. Valve 114 has a third wing 118 which is slightly longer than wings 116 *a-b*, and is disposed beneath wing 116 *b* at an angle, for the purpose of blocking any food from leaking out of aperture 112 and maintaining the freshness of the stored dry food. When handle 130 is depressed, valve 114 rotates counter-clockwise to an opening angle, thereby allowing food to pass through base 110 and out of dispenser 200 through aperture 112.

For determining the maximum opening angle that valve 114 will be allowed to turn, there is provided as part of handle actuator 150, position limiting means in the form of a rotatable handle-position stop 126 having a circumferential shoulder 127 which fits into a fixed handle-position stop 124 having an internal truncated rim 125. Rotatable stop 126 rotates counter-clockwise along with handle 130 when it is depressed, inside of fixed handle-position stop 124 along its internal truncated rim 125. When circumferential shoulder 127 hits the edge of truncated rim 125, stop 126 cannot rotate anymore, and handle 130 cannot continue to be depressed further.

Rotatable handle-position stop 126 may be designed with a variation in the length of circumferential shoulder 127, in order to determine the maximum opening angle to which valve 114 can rotate. For example, if shoulder 127 is longer, then handle position stop 126 can rotate less before it hits the edge of truncated rim 125, thereby reducing the opening angle to which handle 130 can become depressed. Alternatively, with a shorter shoulder 127, more rotation of handle position stop 126 is possible. On the reverse side of fixed handle position stop 124, there is attached spring 122 which is connected to a spring base 120 having a flat portion 121 which fits, from behind, into the center of fixed handle position stop 124, and the center of rotatable handle position stop 126. Spring base 120 is positioned within base socket 119 that is embedded in base 110. When handle 130 is released after being depressed, spring 122 twists handle actuator 150 clockwise back to its original position, thereby rotating valve 114 back to its original position and blocking the exit of the stored food.

Overview

An aspect of some embodiments of the current invention relates to an automatic dry goods dispenser. In some embodiments a manual dispenser may be upgraded for automatic and/or sanitary dispensing (e.g., avoiding touching the dispenser with the hands). For example, a motor may be mounted to the dispenser. The motor optionally opens and/or closes a valve for dispensing the goods. Optionally, the opening and/or closing is adjustable to function efficiently for different types of dry goods (for example having different densities and/or shapes). For example, the opening and closing may be adjusted to achieve a desired flow rate and/or dispensing volume. In some embodiments, the dispenser is designed to avoid grinding and/or damaging the goods. In some embodiments, the device in designed to achieved controlled flow and/or avoid spilling of goods. For example, the valve and/or actuator may be designed to avoid dispensing and/or leaking of goods when there is no container to receive the goods. For example, the device may include a valve biased to a closed configuration and/or a motor that opens the valve for a fixed time and/or that opens the valve for as long as a switch remains in an activated position and/or oscillates the valve between a maximum and minimum opening for as long as the switch is activated and/or oscillates the valve between a maximum and minimum opening for a fixed time and then closes the valve each time switch is activated. Optionally, a manual operation option is available.

In some embodiments, the opening and/or closing may be preprogrammed. Optionally, a user will purchase goods and/or a program will be transferred to the dispenser according to his purchase. For example, according to the amount that was purchased, upon pushing the actuator, the valve will be opened and/or oscillated in a way to dispense the purchased quantity of goods and/or will then close. In some embodiments, pushing the actuator switch may trigger the preprogrammed opening and closing program which will then continue till its finish regardless of activity of the switch. Alternatively or additionally, pushing the actuator switch may trigger the preprogrammed opening and closing, releasing the switch may interrupt the opening and closing (e.g., by closing the valve) and/or pushing the switch again may trigger continuation of the program. Optionally, the program may be interrupted and/or resumed multiple times until the programs finishes and/or until a new program is entered into a controller of the dispenser. For example, when a customer pays for a certain quantity of product he may receive a receipt with a visual code (e.g., a barcode and/or a QR code). The dispenser optionally includes a code reader (e.g., a camera and/or software) that reads the quantity to dispense from the codes. The controller is optionally preprogrammed to open and/or close the valve is a way that will dispense the proper quantity.

In some embodiments, dry goods may have various physical characteristics causing them to flow and/or jam and/or crush under various conditions. A dispenser for dry goods may include features to foster clean controlled flow without damaging the goods. Optionally, the device may be configured and/or adjusted to foster a desired flow for a particular product. For example, a dispenser for cornflakes may be adjusted to encourage flow and/or avoid jamming while avoiding grinding the fragile flakes. For example, a container for dispensing lentils may be adjusted to limit flow and/or achieve a reliable slow flow. For example, using the setting of cornflakes with lentils may result in an uncontrolled flood of lentils and/or lots of spilled material. For example, using the setting for lentils with cornflakes may result in uneven and/or blocked flow and/or grinding and/or ruining the flakes.

In some embodiments, a dispenser is supplied with a hygienic actuator. For example, the actuator may be designed to activate dispensing without hand contact. Alternatively or additionally, the actuator may be designed to avoid mis-dispensing of the product. For example, the actuator may include a lever that is activated by pushing with a container under the spout of the dispenser. Alternatively or additionally, a sensor (for example a light source and/or a light sensor) may prevent activation when there is no container and/or may activate the valve when there is a container.

In some embodiments, an electric motor drives a free flow valve of a dry goods dispenser. For the sake of the current disclosure, a free flow valve is a valve that when open allows flow (e.g., gravity flow). For example, various aspects of the opening of the valve may be adjustable. For example, the maximum opening and/or the time of opening. In some embodiments the valve may oscillate between a maximum open state in which the value may be fully and/or partially opened and/or a minimal opened state wherein the valve may be fully and/or partially closed and/or less open than the maximum open state. Optionally, the rate of oscillation, the size and/or angle of the maximum opened position and/or the size and/or angle of the closed portion of the oscillation cycle may be adjustable.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
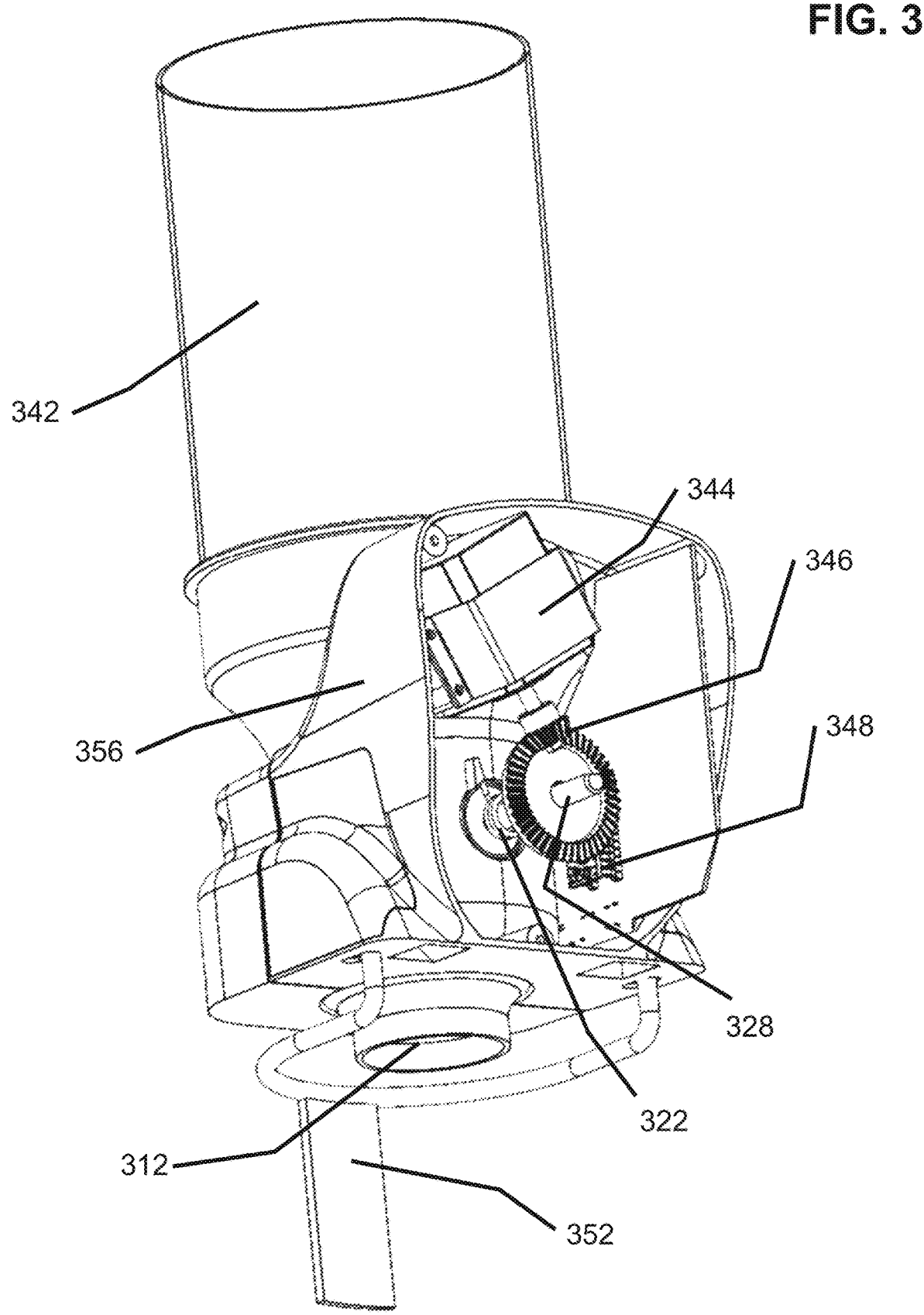
FIG. 3 illustrates a cutaway view of a front of a dry goods dispenser in accordance with an embodiment of the current invention.

Referring now to the drawings, FIG. 3 illustrates a cut away view of a dry goods dispenser in accordance with an embodiment of the current invention. In some embodiments, a motor drives a shaft to open and/or close a valve releasing city goods from a receptacle. Optionally, a controller (for example a microprocessor mounted on a printed circuit board (PCB)) determines a mode and/or cycle of motor actuation. For example, an actuator handle may activate the controller to command to the motor to open and/or close the valve according to a preset cycle and/or mode. According to the opening and/or closing of the valve, goods from the receptacle are dispensed out a spout (for example under gravitational flow). Optionally, the dispenser is connected to an electricity power grid and/or runs off of alternating current. Alternatively or additionally, the dispenser may run from a DC power source e.g., a battery and/or a solar cell etc.).

In some embodiments, a manual thy goods dispenser (for example as pictured in FIGS. 1-3) may be retrofit for automatic and/or touch free operation. For example, the system may include one or more of a motor 344, controller 348, transmission 346 and/or hands-free actuator switch 352 the motor 344 and transmission 346 may be installed onto a manual dry goods dispenser. Alternatively, a dry goods dispenser may be built originally for automatic operation with a receptacle 342, free flow valve (e.g., as described in FIGS. 1 to 3) a motor 344, a transmission 346 and/or a controller 348.

Referring now to FIG. 3, in some embodiments, the motor 344, for example, an AC motor, a brushless motor and/or a DC motor. For example, the motor 344 may turn a transmission 346 that turns a shaft 328 that opens and/or closes a valve. Alternatively or additionally, the valve may include a linear actuator and/or a brushless motor and/or another sort of actuator that opens and closes the valve in response to commands of the controller 348. Optionally, the valve is biased closed (e.g., such that if there is a system failure and/or power failure, the valve will default to a closed state). For example, there may be a mechanical biasing element (for example an elastic element such as a spring (e.g., spring 122 as illustrated in FIG. that biases the valve to the closed configuration.

In some embodiments, an actuator switch 352 is designed for sanitary use. Optionally, a user may activate dispensing of the goods without touching a shared surface (e.g., a handle and/or an activation button). For example, an actuator switch 352 may be designed to activate dispensing when a container is pushed into position under a dispensing spout 312. Alternatively or additionally, dispensing may be activated when an actuator 352 switch is pushed by a wall of the vessel. Alternatively or additionally, a sensor (such as a light detector and/or light source) may be used to detect the presence of a container under the spout 312. Additionally or alternatively, a digital communication system may give instructions to unlock dispensing and/or determine how much and/or how fast dispensing should occur. For example, a user may have an application on a personal computing device (e.g., his cell phone and/or a digital self-checkout scanner) to instruct the controller of a dispenser to dispense a predetermined amount of goods into a container when the container is placed under the spout. Alternatively or additionally, a dispenser may include a reader (such as a bar code reader and/or a QR code scanner and/or a magnetic strip reader) such to receive digital instructions. Alternatively or additionally, a dispenser may include a identity detector (for example receiving a signal from a personal computing device of a user and/or an RF tag) and/or estimate the quantity of goods taken by user and/or bill the user (for example, by charging a credit card and/or charging an account and/or adding a charge to a self-check out system). Alternatively or additionally, the dispenser may include a printer and/or a screen for displaying a barcode that can be attached to the container and/or read by a self-checkout device.

In some embodiments, the dispenser may be designed for first in, first out operation. For example, goods are added to the top of the receptacle 342 and/or removed through a spout (e.g., by gravity flow) from the bottom of the receptacle 342.

Figure 4:
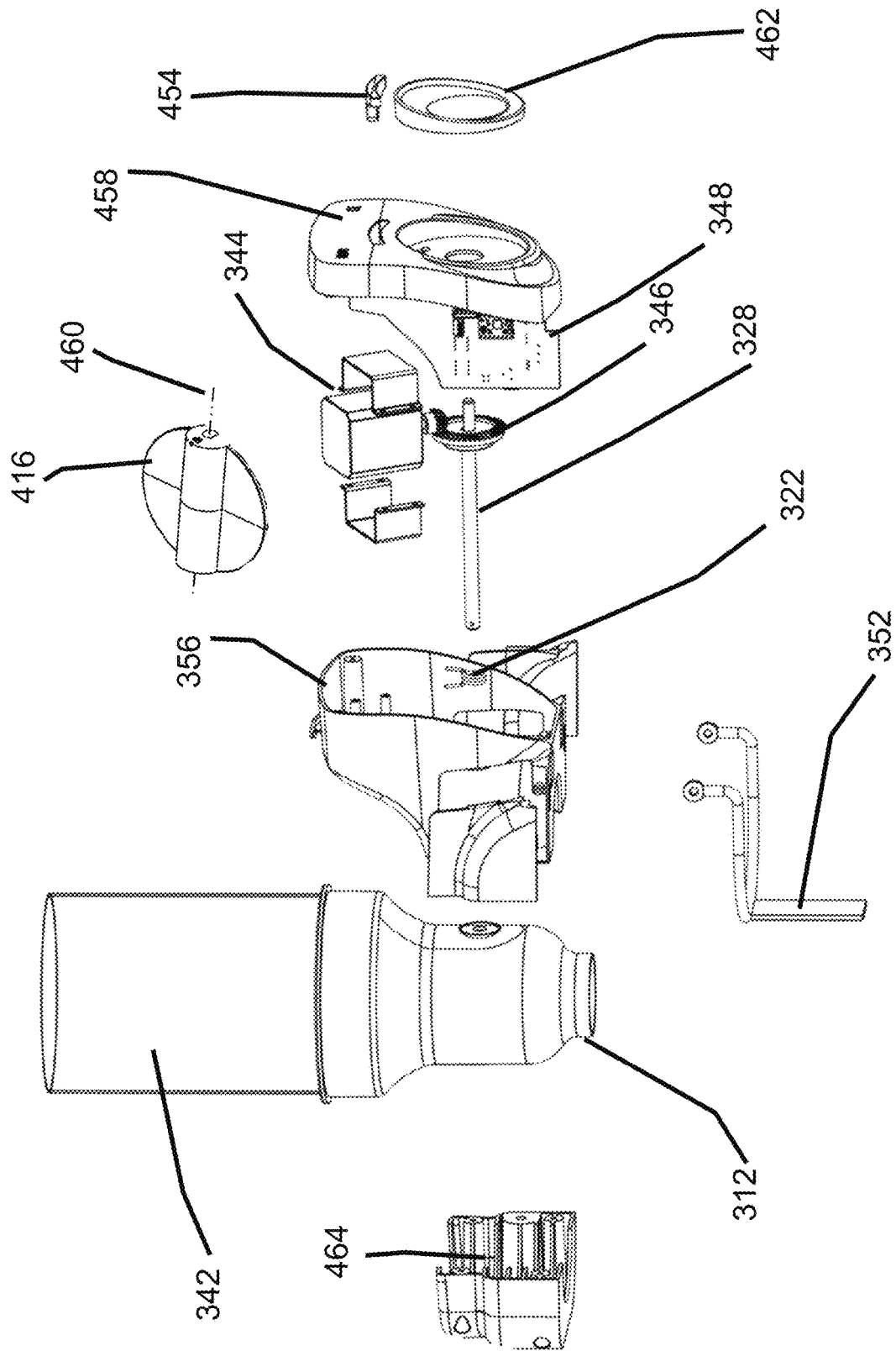
FIG. 4 is an exploded perspective view of a dry goods dispenser in accordance with an embodiment of the current invention.

FIG. 4 is an exploded perspective view of a dry goods dispenser in accordance with an embodiment of the current invention. For example, a flap of valve 416 may be mounted along its axis 460 and/or on a shaft. Turning the shall may rotate the flaps of valve 416 around its axis. For example, rotating the flaps of valve 416 may open and/or close a passage between a receptacle 342 for goods and a dispensing spout 312. A controller 348 may include a processor, memory, software and/or a user interface (for example, an operating and/or signaling light 454). For example, the processor may signal a motor 344 to open the valve 416, close the valve 416 and/or oscillate the valve 416 back and forth between maximally open positions (e.g., fully open or partially open) and/or a minimally open position (fully or partially, closed position) and/or a closed position.

In some embodiments, the system has a cover 458 and/or a front plate 462. For example, the front plate 462 may be removed and a manual handle installed for manual operation.

Figure 5:
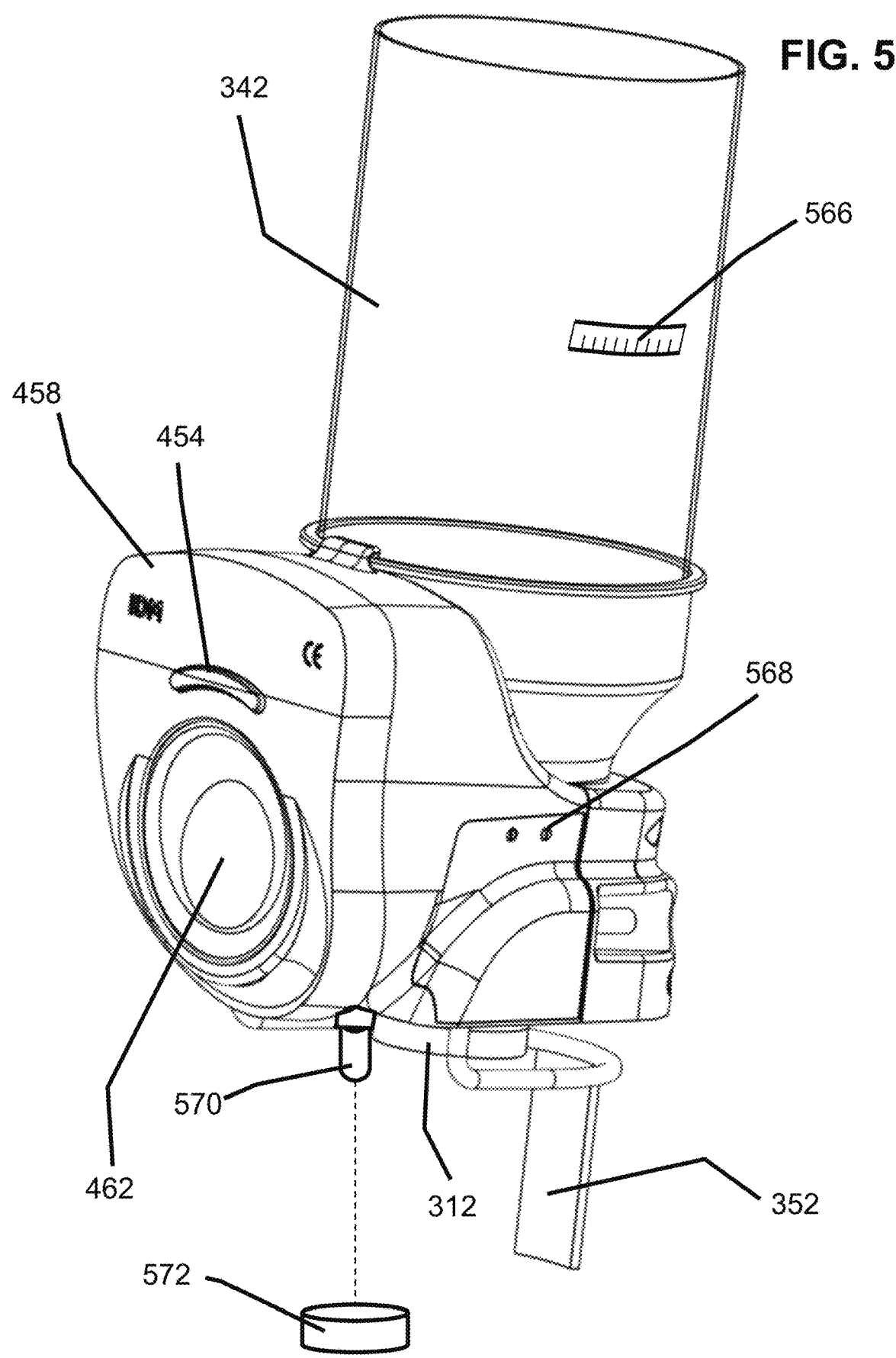
FIG. 5 is a perspective view illustration of a dry goods dispenser in accordance with an embodiment of the current invention.

FIG. 5 is a perspective view illustration of a dry goods dispenser in accordance with an embodiment of the current invention.

In some embodiments, a dispenser may include a sensor. For example, a light source 570 and/or light sensor 572 may be used to determine if there is a vessel under the spout 312 of the dispenser. For example, when light travels uninterrupted between the light source 570 and the sensor 572 the device may be inhibited from dispensing. Optionally, this will prevent spillage of food, for example when kids play with the actuator switch 352 and/or if the actuator switch 352 gets jammed in the activated position. Alternatively or additionally, the system may only dispense goods after receiving instructions and/or confirmation of payment. For example, the dispenser may limit dispensing to a quantity specified in the instructions. For example, the instructions may be communicated over a wireless channel and/or a network.

In some embodiments a dispenser may include an adjustment interface. For example, there may be adjusting screws 568. For example, a screw 568 may be turned one way to increase that maximum opening of the valve and/or another direction to decrease the maximum opening during oscillation of the valve. In some embodiments, the adjustments may be implemented mechanically. For example, the size of the valve opening may be limited by a valve stop (e.g., there may be stop ring 126 and shoulder 127 and truncated rim 125 for example as described in FIG. 2 and/or screws 568 may move a physical valve stop similar to truncated rim 125 allowing the valve to open larger or smaller). Alternatively or additionally, the user interface may change performance of the electric actuator. For example, screws 568 may change a potentiometer and/or an adjustable resistor that may control power to the motor 344. Alternatively or additionally, the interface may be connected to the controller (e.g., controller 348). For example, turning a screw 568 may indicate to the controller 348 to change the program of the motor 344. Additionally or alternatively, another screw 568 may adjust a rate of oscillation of a valve 416 between a minimum opening and a maximum opening. Additionally or alternatively, another screw 568 may be turned one way to increase that maximum opening of the valve 416 and/or another direction to decrease the maximum opening. Additionally or alternatively, another screw 568 may be supplied to adjust a time before the valve 416 closes after activation. Alternatively or additionally, a valve 416 may stay open and/or continue to oscillate as long as a user holds the actuator switch 352 activated. Alternatively or additionally, a user interface may facilitate a user defining an amount of product desired and/or the amount time that the valve remains in the open and/or oscillating state may be adjusted according to a quantity of product requested. In some embodiments, the adjustments of the dispenser may be made by a technician based on the goods to be dispensed.

In some embodiments, the dispensing may be adjusted automatically. For example, an app may be run on a personal computing device of an operator (e.g., an operator may include a vendor and/or store owner who supplies the machine for use by customers who are users of the dispenser) and/or a technician. Optionally, the app requests details about the product being sold. For example, the app may receive as input the shape of the product (e.g., spheres, jagged shaped, smooth, flakes, cylinders) and/or the density (for example the operator may give a measured density and/or report how much of the receptacle is filled with a specific mass of goods (e.g., 5 kg half fills the receptacle 342)). Alternatively or additionally, an operator may fill the receptacle 342 with a specified mass of product and take a picture of the receptacle 342. The receptacle optionally includes a window and/or is transparent and/or includes fiducial marker 566. For example, an image processing program and/or an artificial intelligence routine based on the image determines the size and shape and density of the goods and/or an appropriate adjustment for the opening program of the valve 416. For example, for a larger and/or more jagged and/or more non-uniform and/or less dense goods the valve 416 may open larger. For thinner goods, the valve 416 may oscillate more slows (e.g., to reduce grinding). Optionally, the system will facilitate corrective adjustment. For example, an operator may specify in an app that the goods are exiting too fast and/or too slow. For example, when the dispensing is too fast system may automatically reduce the flow rate, for example by reducing the maximum and/or minimum valve opening. For example, an operator may specify in an app that the goods are getting ground up and/or the system will automatically reduce the grinding effect, for example by reducing the oscillation rate. For example, an operator may specify in an app that too much of goods are dispensed. Optionally the system will automatically reduce the quantity dispensed, for example by decreasing the amount of time that the valve 416 is held open and/or oscillating.

Figure 6:
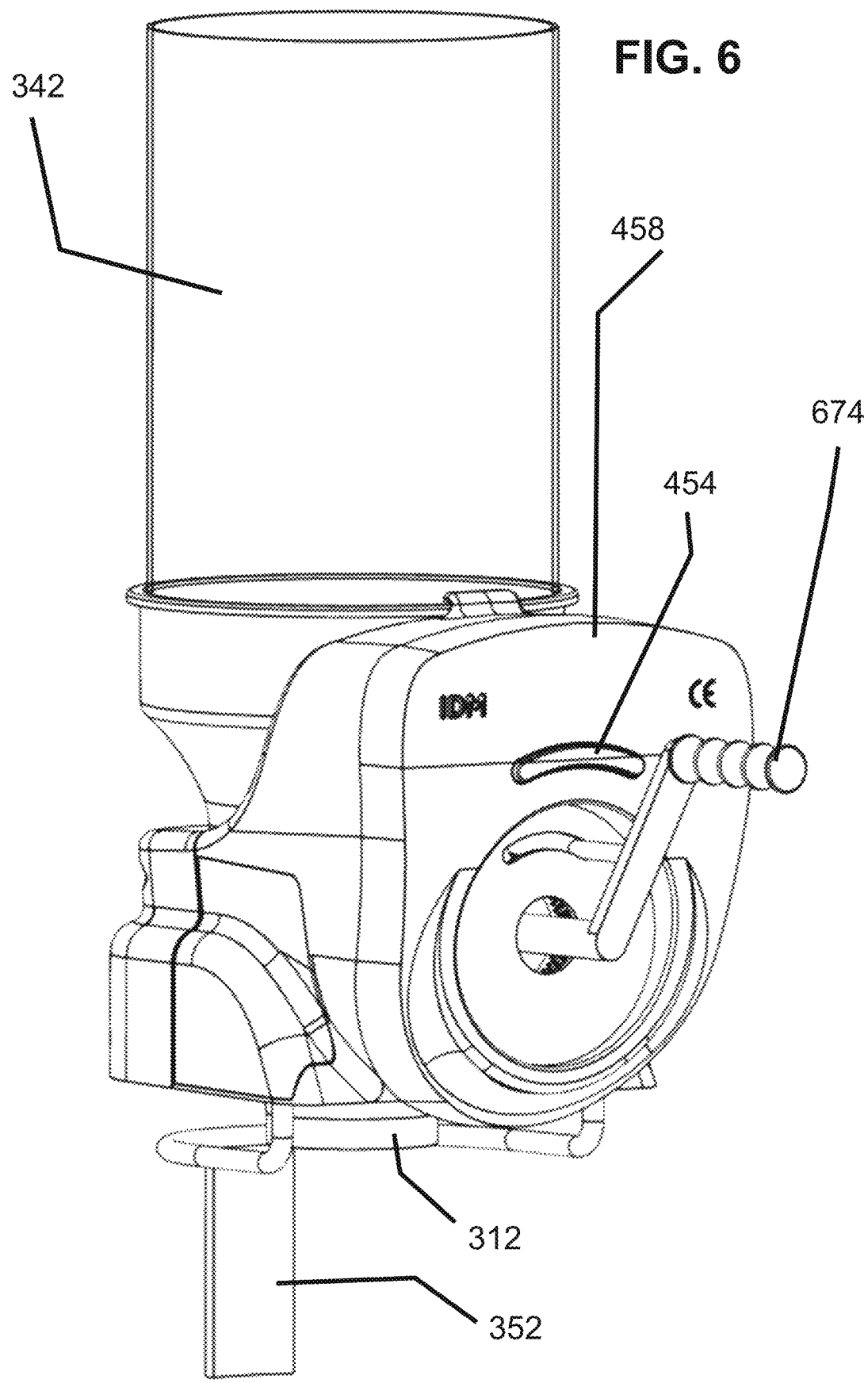
FIG. 6 is a schematic perspective view illustration of a dispenser with an optional manual actuator in accordance with an embodiment of the current invention.

FIG. 6 is a schematic perspective view illustration of a dispenser with an optional manual actuator 674 in accordance with an embodiment of the current invention. In some embodiments, an automatic dispenser includes a manual operation option. For example, a face plate (e.g., face plate 462 illustrated in FIG. 5) may be removed from the device and/or a manual actuator 674 may be attached to the dispenser. For example, the manual actuator 674 may be attached to a valve shaft (e.g., shaft 128 as illustrated in FIG. 2) and/or the manual actuator 674 may be turned to open a valve. The manual actuator 674 may allow the system to be used where there is no electrical power and/or when there is a malfunction and/or a power outage. Alternatively or additionally, the manual activator 674 may facilitate emptying and/or cleaning the dispenser when and/or where there is no electricity. For example, a face plate of the dispenser may be removed and/or a manual handle 674 connected to a shaft of a valve and/or the handle may be turned to open the valve.

Figure 7:
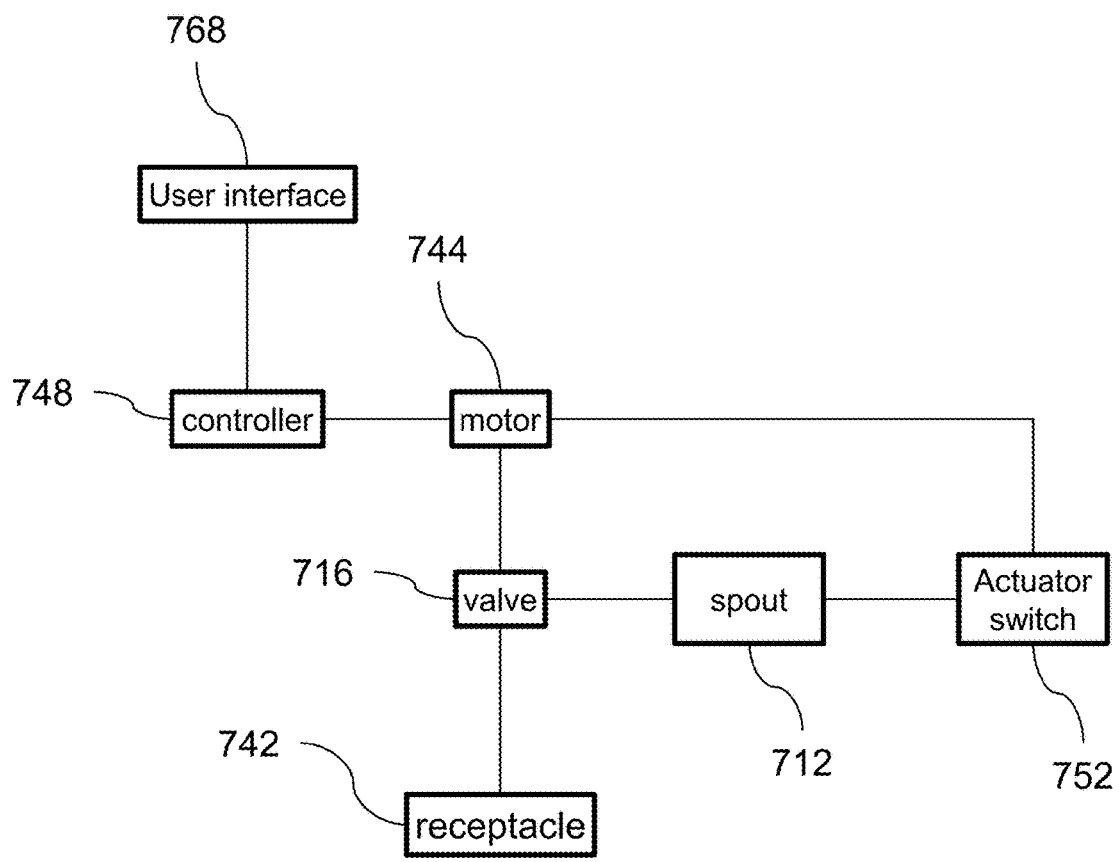
FIG. 7 is a block diagram of a dispenser in accordance with an embodiment of the current invention.

FIG. 7 is a block diagram of a dispenser in accordance with an embodiment of the current invention. For example, an activator switch 752 may connect to a spout 712 such that a dispensing of goods (e.g., freely and/or according to a program) may be activated when a receptacle 742 is placed under the spout 712. For example, dispensing may be activated by a motor 744. The motor 744 optionally opens a valve 716 that intervenes between a receptacle 742 (e.g., containing dry goods to be dispensed) and the spout 712. Alternatively or additionally, the motor 744 may cause the valve to oscillate, for example, between a maximum opening and a minimum opening (the maximum and/or minimum opening may be fully open, fully closed and/or partially open).

In some embodiments, the opening and/or closing of the valve 716 is controlled by a controller 748. For example, the controller 748 may include a user interface 768. For example, the user interface 768 may include a physical interface (e.g., a knob and/or a button and/or a switch) Alternatively or additionally the user interface 768 may include a wireless communication interface (for example facilitating control of the dispenser via an app on a personal computing device). Alternatively or additionally, the user interface may 768 include an optical reader and/or magnetic reader (for example a bar code reader, a QR reader, a RF tag reader, a magnetic strip reader). Alternatively or additionally, the user interface 768 may include a network interface. For example, the device may be controlled remotely and/or adjusted remotely (e.g., by a remote technician and/or dispensing may be dependent on approval by a credit authority). Alternatively or additionally, the user interface 768 may include a digital interface such as a keyboard, a touch screen, a view screen etc. Optionally, the dispenser is integrated into a self check out system (for example, reporting a quantity, type and/or cost of a dispensed product to a billing system and/or printing a code identifying goods and/or displaying a code identifying goods to a check out scanner and dispensing goods according to a prepaid quantity).

Figure 8:
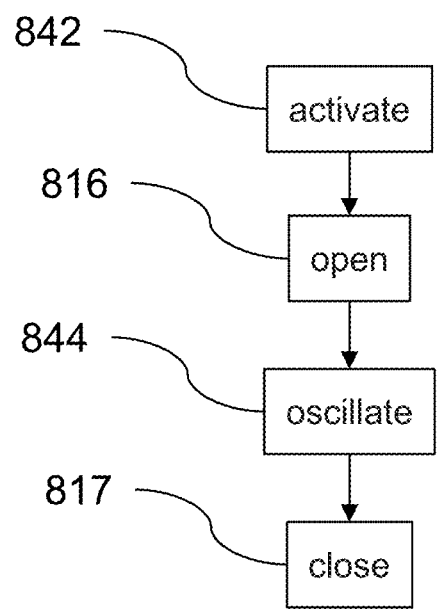
FIG. 8 is a flow chart illustration of a method of dispensing in accordance with an embodiment of current invention.

FIG. 8 is a flow chart illustration of a method of dispensing in accordance with an embodiment of current invention. In some embodiments the dispenser is activated 842 to dispense goods. For example, activation 842 may include pushing a physical activation switch (for example by means of pushing a container under a dispensing spout). For example, a valve may open 816 (e.g., in a static and/or oscillating 844 position) as long as the switch is activated. Alternatively or additionally, pushing the switch once may cause a programmed and/or timed opening 816, closing 817 and/or oscillation 844 of the valve. Alternatively or additionally, activation 842 may include giving more complex instructions and/or may be dependent on sensors and/or may be dependent on approval of a payment system. Optionally when the activation 842 stops and/or when the programmed dispensing is finished, the valve is closed 817 until the next activation.

In some embodiments, the dispenser is integrated into an automatic checkout system. For example, the dispenser may dispense according to instructions received from the checkout system and/or approval for dispensing for the system. Alternatively or additionally, the dispenser may report what was dispensed and/or produce labels to be read by the checkout system. For example, the system may receive instructions (e.g., over a network from an automatic checkout system and/or via a signal from a user's computing device and/or from reading a code (e.g., a bar code and/or a QR code)) to dispense a preselected quantity of goods. Optionally, until the preselected quantity has been dispensed, the system will release goods (e.g., by opening 816 and oscillating 844 a valve) in response to a user activating 842 a switch. Once the predetermined quantity has been dispensed, the valve is optionally closed 817 until new instructions are received.

In some embodiments a valve may oscillate 844 between a maximum opening and minimum opening. For example, the maximum opening may range between 90 to 100% and/or between 70 to 90% and/or between 50 to 70% and/or between 30 to 50% of fully open. For example, the minimum opening may range between 90 to 100% and/or between 70 to 90% and/or between 50 to 70% and/or between 30 to 50% of fully closed. For example, the oscillation 844 rate may range between 1 to 10 oscillations a minute and/or between 10 to 30 oscillations a minute and/or between 30 to 100 oscillations a minute and/or between 100 to 1000 oscillations a minute. For example, the maximum opening may range between 1 to 5 square cm and/or between 5 to 20 square cm.

Optionally a valve gate (e.g., wings 116*a*, 116*b*) may be of soft material, for example, silicon and/or elastomer.

Figure 9A:
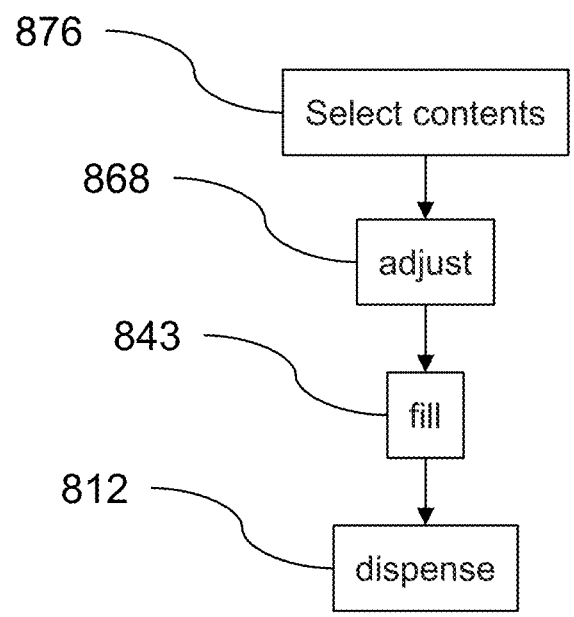
FIGS. 9A and 9B are flow chart illustrations of a method of adjusting a dispenser in accordance with an embodiment of the current invention.
Figure 9B:
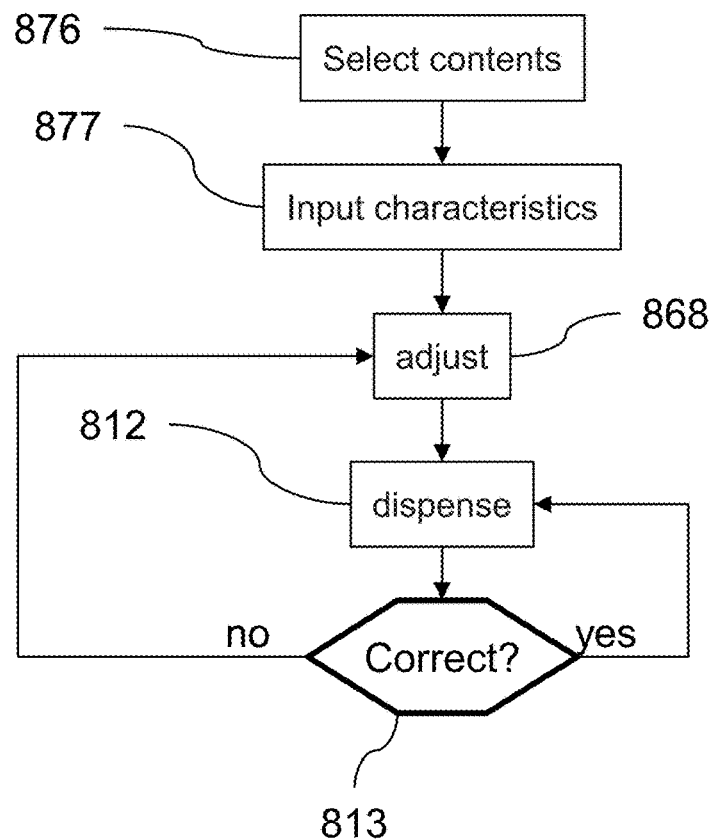

FIGS. 9A and 9B are flow chart illustrations of a method of adjusting a dispenser in accordance with an embodiment of the current invention. For example, an operator of the dispenser may select 876 what contents will be dispensed. He may input 877 the contents of the device, for example by informing a technician and/or an automatic adjustment app what are the contents. For example, the system may have preset settings for common products (e.g., rice, cornflakes, oatmeal, raw popcorn, cooked popcorn, chips, beans, lentils, pasta, cereal etc.) and/or the operator may input the kind of product and/or a set of preliminary adjustments are selected automatically. Alternatively or additionally, the user may input 877 characteristics of the goods (e.g., size, density, hardness, shape etc.). For example, the user may input characteristics such as density, shape, size etc. manually (e.g., as described above) and/or via a measuring routine (e.g., as described above, an optical routine that estimates the properties from an image).

Optionally, the machine is used to dispense 812 the product. While in use, the performance may be evaluated. For example, if the dispenser is correctly 813 (dispenses the proper amount of product in good condition) then dispensing is allowed to continue. Alternatively or additionally, if dispensing is not correct 813 then the dispenser may be readjusted 868 (e.g., as described herein above and/or corrections when the dispensing is not as desired. Optionally, a technician may adjust 868 the dispenser before it is deployed. Alternatively, or additionally, the technician may adjust 868 the dispenser after it is deployed (e.g., by the technician coming to service the device in situ and/or remotely for example programming a controller of the dispenser over a network connection). Alternatively, or additionally an operator of the dispenser may, adjust 686 the dispenser, for example using an application on a computing device and/or via images of the goods etc. for example as described above. Either before or after the dispenser is adjusted 868 is may be filled 843 with the product and/or used to dispense 812 the product.

Figure 10:
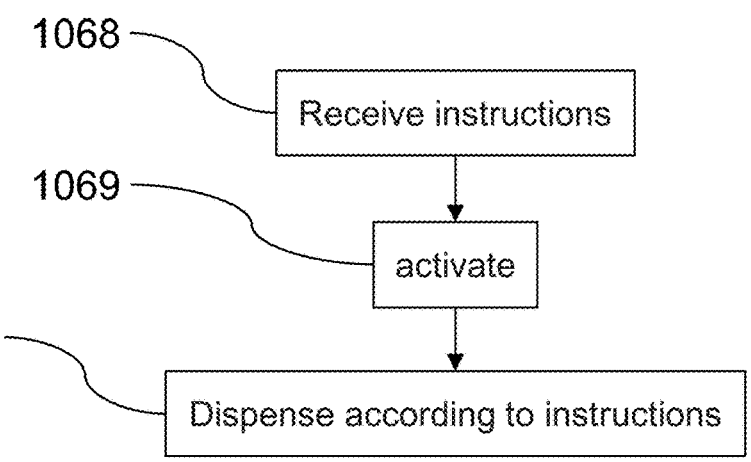
FIG. 10 illustrates use of a dispenser in accordance with an embodiment of the current invention.

FIG. 10 illustrates use of a dispenser in accordance with an embodiment of the current invention, Optionally, instructions may be conveyed to and/or received 1068 by the device. For example, a user may make a payment and/or get approval for dispensing and/or the approval may be for a particular quantity of product. For example, the instructions may be conveyed by an automatic check out machine over a network and/or the user may receive a token (for example, a physical object with a bar code and/or QR code printed thereon which is read by the dispenser and/or a code on a personal computing device that may be read by the dispenser (e.g., as a barcode and/or QR code on a screen of the device and/or via a wireless connection e.g., Bluetooth)). For example, instructions may be received 1068 from a personal computing device of a user and/or over a wireless communication. For example, instructions may be received over a local user interface. For example, instructions and/or approval may be received 1068 from a network and/or from a credit authority and/or from an automatic checkout system. Optionally, after instructions are received 1068, a user may activate 1069 the dispenser to dispense 1012 according to the instructions (for example, by putting a vessel under the spout of the dispenser and/or pushing an activator switch).

Figure 11:
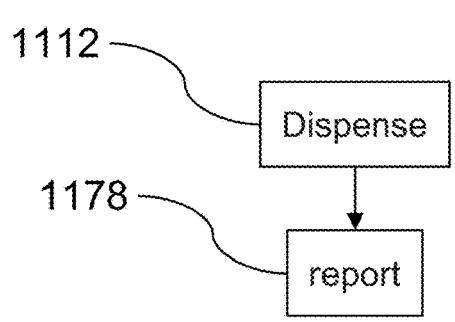
FIG. 11 illustrates dispensing in accordance with an embodiment of the current invention.

FIG. 11 illustrates dispensing in accordance with an embodiment of the current invention. For example, a user may activate a dispenser to dispense 1112 a quantity of product. Optionally, the dispenser may report 1178 details of the dispensing 1112. For example, reporting may be to a personal computing device of a user and/or over a wireless communication and/or by printing a code (e.g., a barcode and/or a QR code). For example, the details may be sent to automated checkout station and/or read by an automatic checkout station. For example, reporting 1178 may be to a network and/or to a credit authority and/or to an automatic checkout system.

Figure 12A:
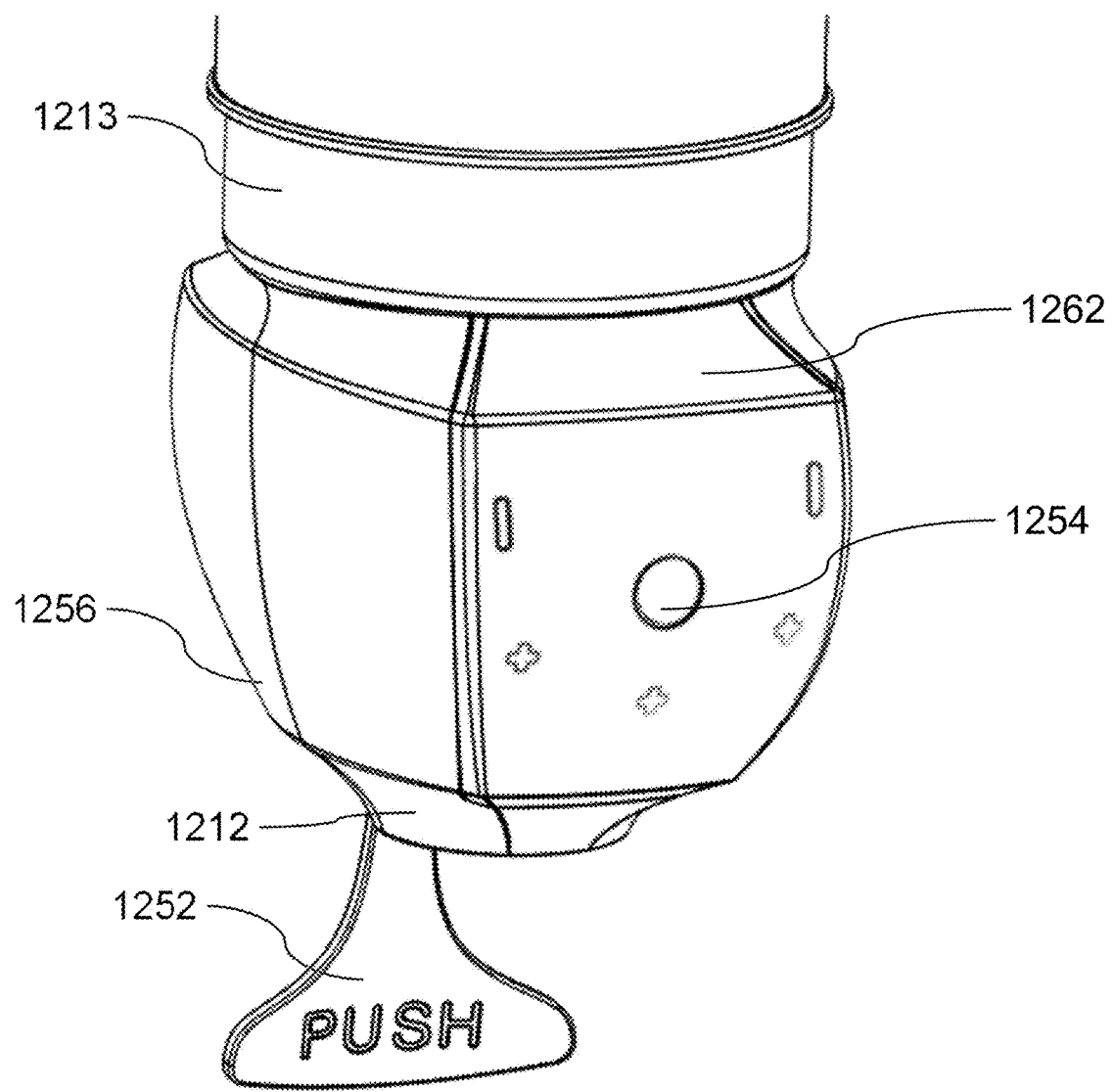
FIG. 12A illustrates front view of a dispenser in accordance with an embodiment of the current invention.
Figure 12B:
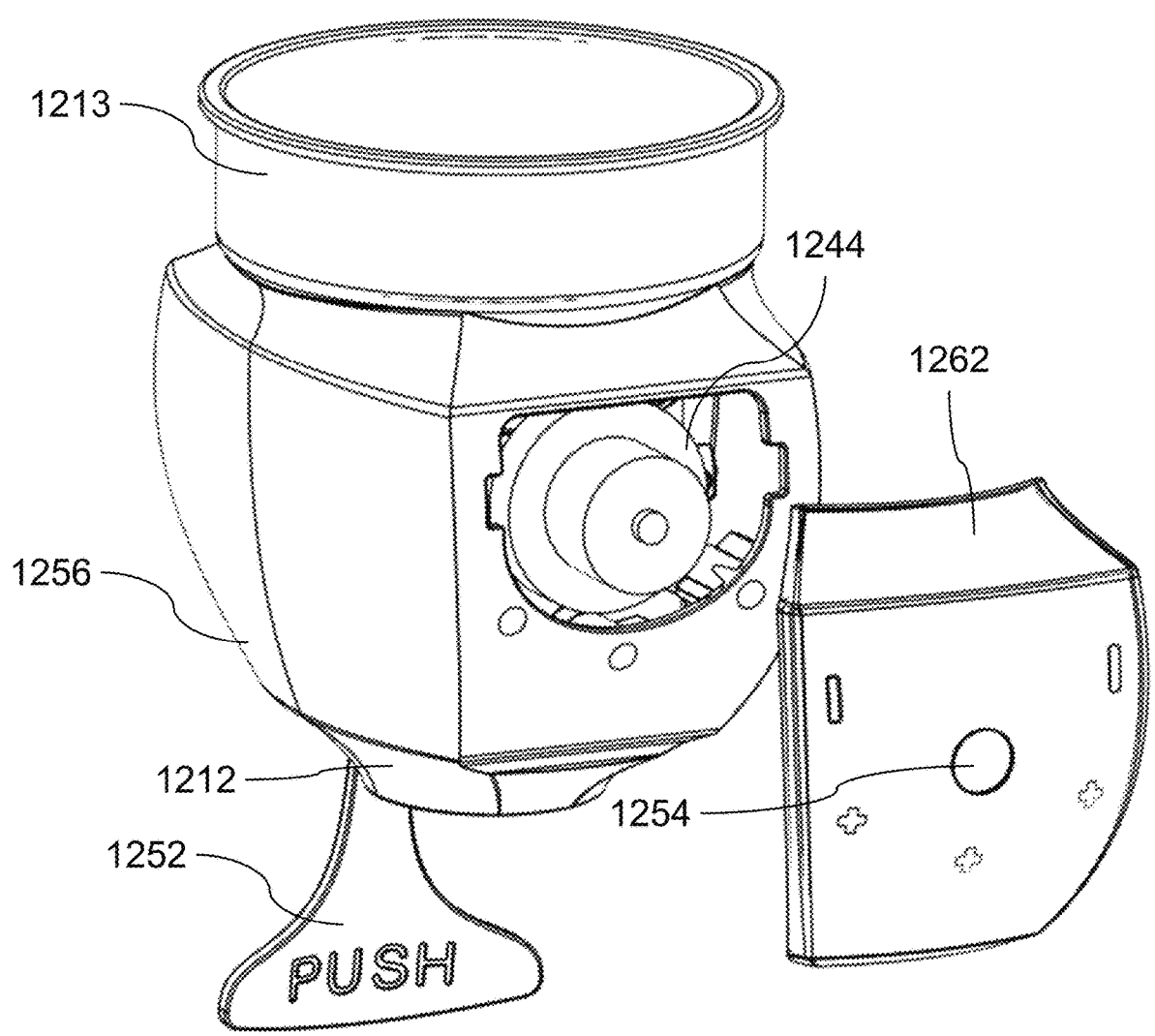
FIG. 12B illustrates front view of a dispenser with an open front cover in accordance with an embodiment of the current invention.
Figure 13:
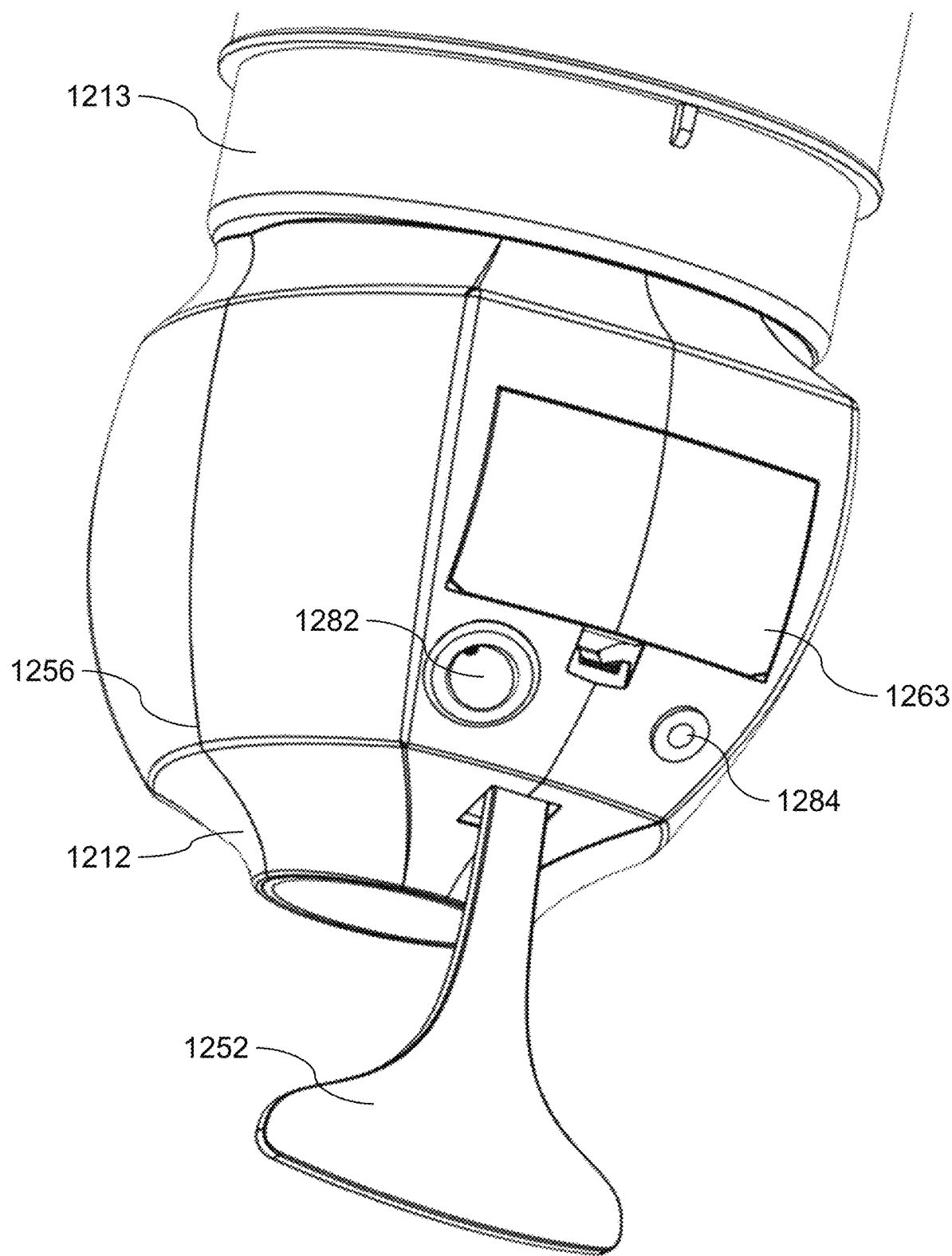
FIG. 13 illustrates front view of a dispenser in accordance with an embodiment of the current invention.

FIGS. 12A and 12B illustrate front views of a dispenser in accordance with an embodiment of the current invention. Optionally, a dispenser includes a motor 1244 connected to a valve to actuate a valve. Optionally, the motor 1244 and/or valve are inside a housing 1256. Optionally, the housing 1256 includes a receptacle adapter 1213 configured for holding a receptacle of dry goods for dispensing. For example, the adapter 1213 may be used with a large receptacle (e.g., for user in a retail establishment selling bulk dry goods) and/or a smaller receptacle (e.g., for use in a food service establishment such as a restaurant and/or salad bar). Optionally, opposite the receptacle adapter 1213 (with the valve therebetween) housing 1256 includes a dispensing spout 1212. Optionally, an activator 1252 facilitates activating dispensing when a user puts a vessel under the spout 1212. Optionally, activator 1252 may include a lever. Alternatively, or additionally activator 1252 may include a sensor (e.g., a light sensor that senses when a vessel is placed under spout 1212). In some embodiments a front cover 1262 covers and/or allows access to the internal parts of the dispenser and/or can be removed to allow access to the internal parts and/or to activate the dispenser manually. Optionally, the dispenser may include an indicator. For example, an indicator light 1254 may glow and/or blink and/or change colors to various functions or states of the dispenser, for example, ready, finished, locked, fault, FIG. 13 illustrates front view of a dispenser in accordance with an embodiment of the current invention. In some embodiments, there may be a rear cover 1263. For example, rear cover 1263 may cover and/or allow access to electronic components of the dispenser. Optionally, the dispenser includes a power input jack 1284 and/or an on-off switch 1282.

Figure 14:
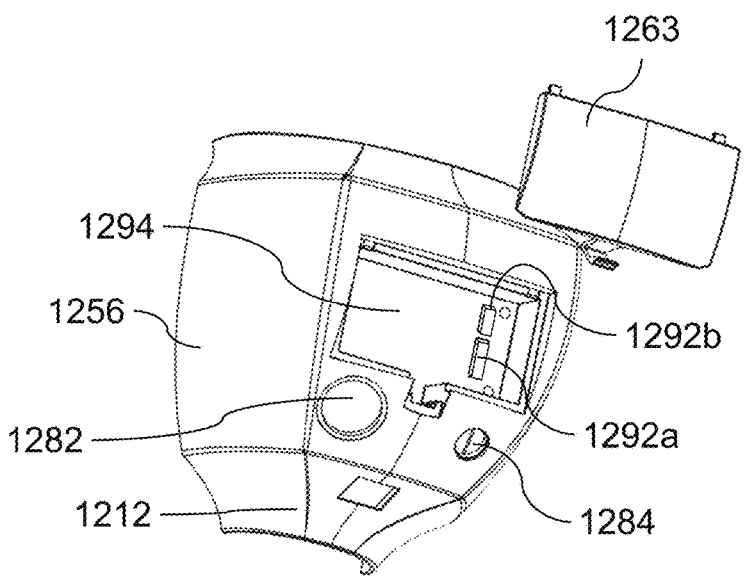
FIG. 14 is a schematic rear view of a dispenser with a rear cover removed in accordance with an embodiment of the current invention.

FIG. 14 is a schematic rear view of a dispenser with a rear cover removed in accordance with an embodiment of the current invention. In some embodiments, under the dispenser includes adjustment controls 1292a and 1292b. For example, a control 1292a may include a toggle button for switching modes of a valve (for example, between static opening, rotation and/or oscillation) and/or a control 1292b (e.g., a toggle button) for determining a maximum and/or minimum opening value for a valve. Alternatively or additionally controls could include a switch and/or a dial. Alternatively or additionally, adjustments may be made using a remote device, for example, over a wireless connection (e.g., Bluetooth) and/or over a network connection. In some embodiments, the dispenser will include a battery 1294. For example, the battery 1294 may be used to hold a valve in a closed when there is a power outage. Optionally, the controls 1292a 1292b may be covered, for example, by rear cover 1263.

Figure 15:
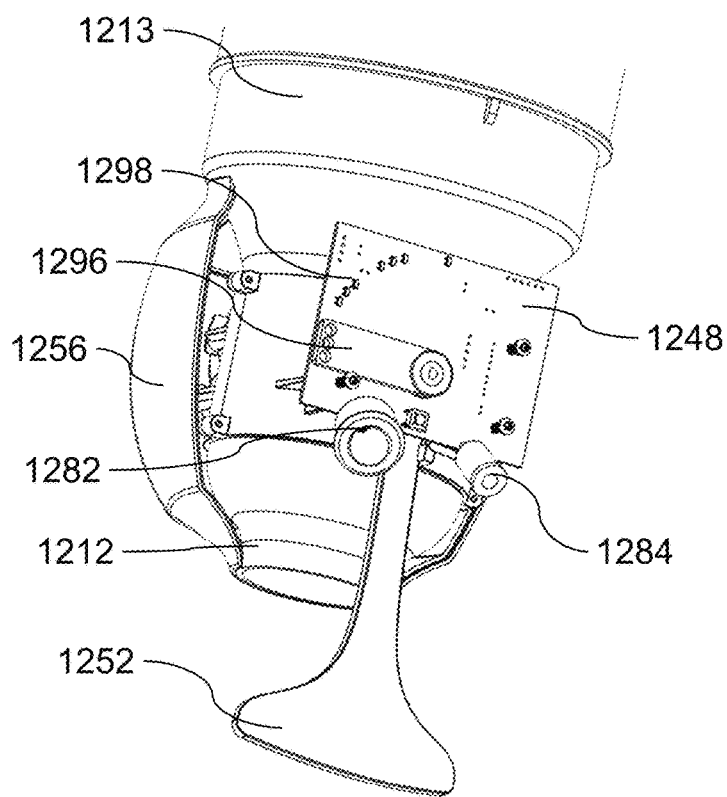
FIG. 15 is a schematic rear view of a dispenser with a rear cover, rear portion of the casing and battery removed in accordance with an embodiment of the current invention.

FIG. 15 is a schematic rear view of a dispenser with a rear cover, rear portion of the casing and battery removed in accordance with an embodiment of the current invention. In some embodiments, a dispenser includes a controller 1248. For example, the controller 1248 may be embodied on a printed circuit board (PCB). Optionally, the PCB includes a valve angle indicator 1296 and/or sensors 1298, for example, for sensing the angle of the valve wings (for example wings of valve 416). Controller 1248 optionally includes wireless and/or network communication hardware and/or software and/or a code reader (e.g., barcode and/or OR code), Controller 1248 is optionally programmable for various dispensing programs.

Figure 16:
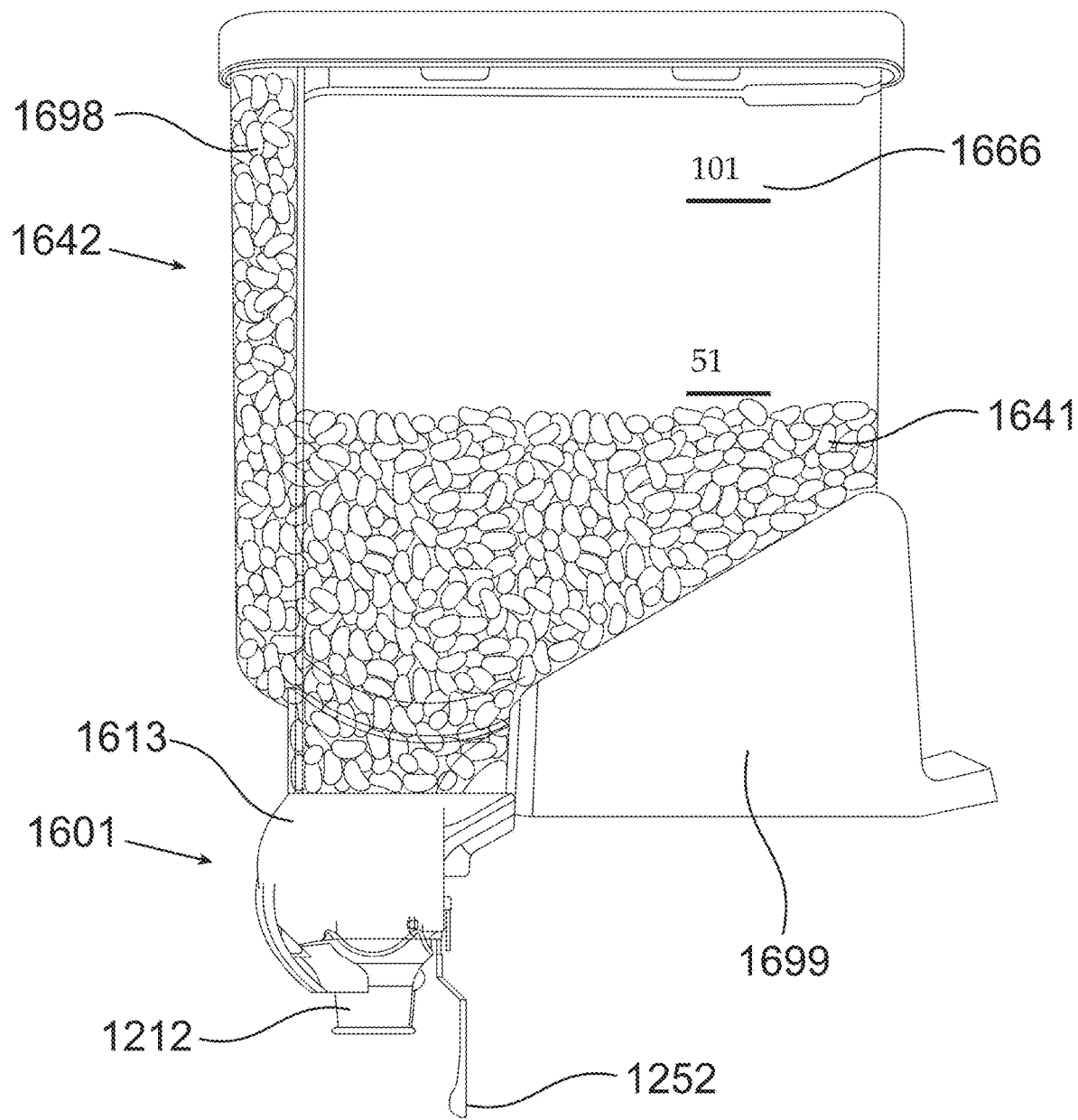
FIG. 16 illustrates a dispenser having a large receptacle in accordance with an embodiment of the current invention.

FIG. 16 illustrates a dispenser having a large receptacle in accordance with an embodiment of the current invention. In some embodiments, a receptacle 1642 supplying dry goods 1641 to a valve assembly 1601 may extend beyond an adapter 1613 and/or the valve assembly 1601, for example, the receptacle 1642 may be supported by a base 1699 separate from the valve assembly 1601. For example, the receptacle may have a large capacity (e.g., between 2 to 5 liters and/or between 10 to 20 liters and/or between 20 to 50 liters. Optionally, the receptacle may include a fiduciary marker 1666 (e.g., to indicate the volume of good 1641 in the receptacle. Optionally, the dispenser may be configured (e.g., via programming of a controller) to receive data on how much goods 1641 are placed into the receptacle and/or how much remains and/or how much is dispensed. Optionally, the dispenser will signal when the receptacle needs to be refilled. Optionally, a receptacle includes an exhibition area 1698 for example, to display the product regardless of how much is left in the receptacle. For example, the exhibition area may an area for storing good 1641 that does not empty to the valve 1601.

Figure 17:
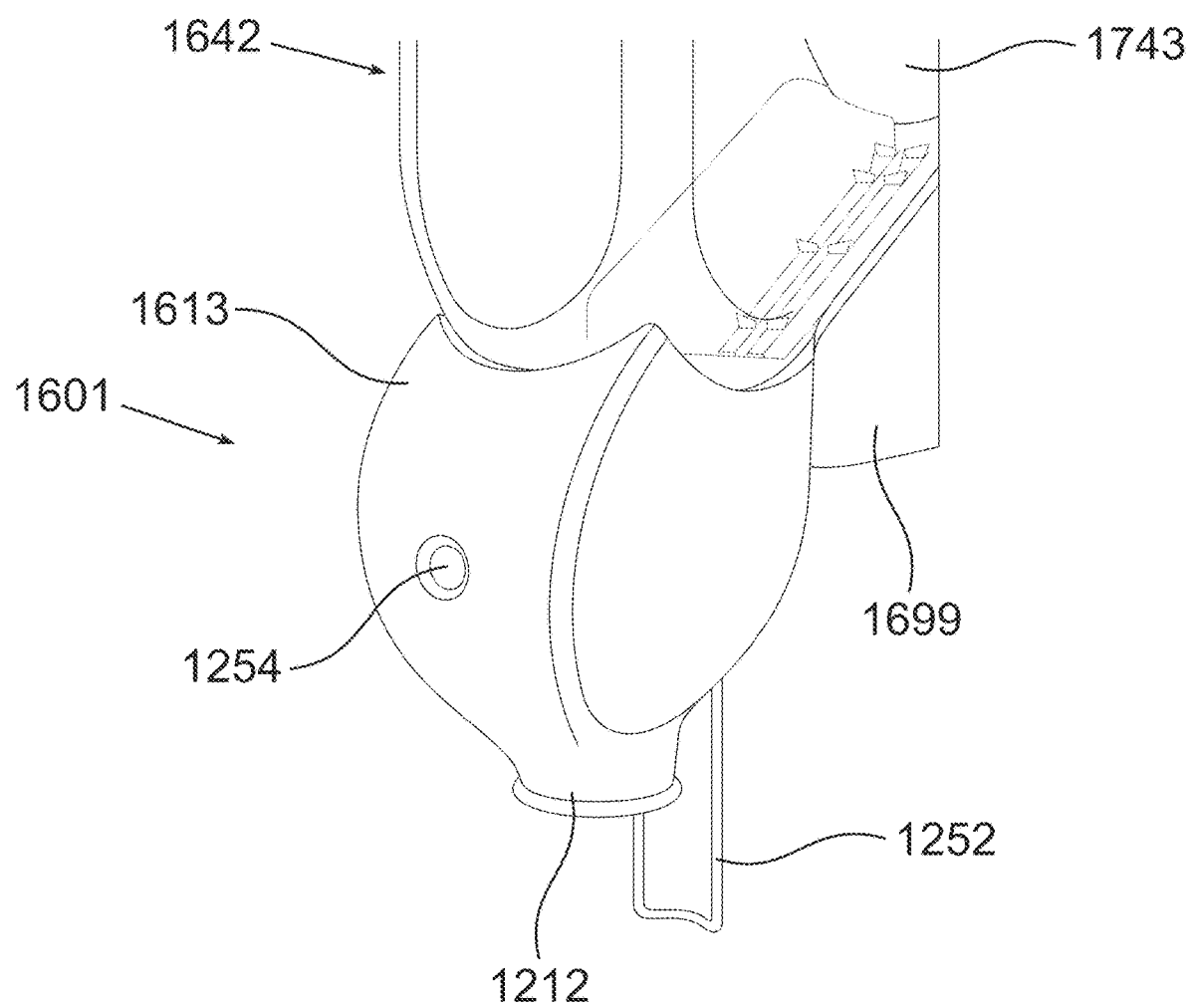
FIG. 17 illustrates a front perspective view of a dispenser having a large receptacle in accordance with an embodiment of the current invention.
Figure 16:
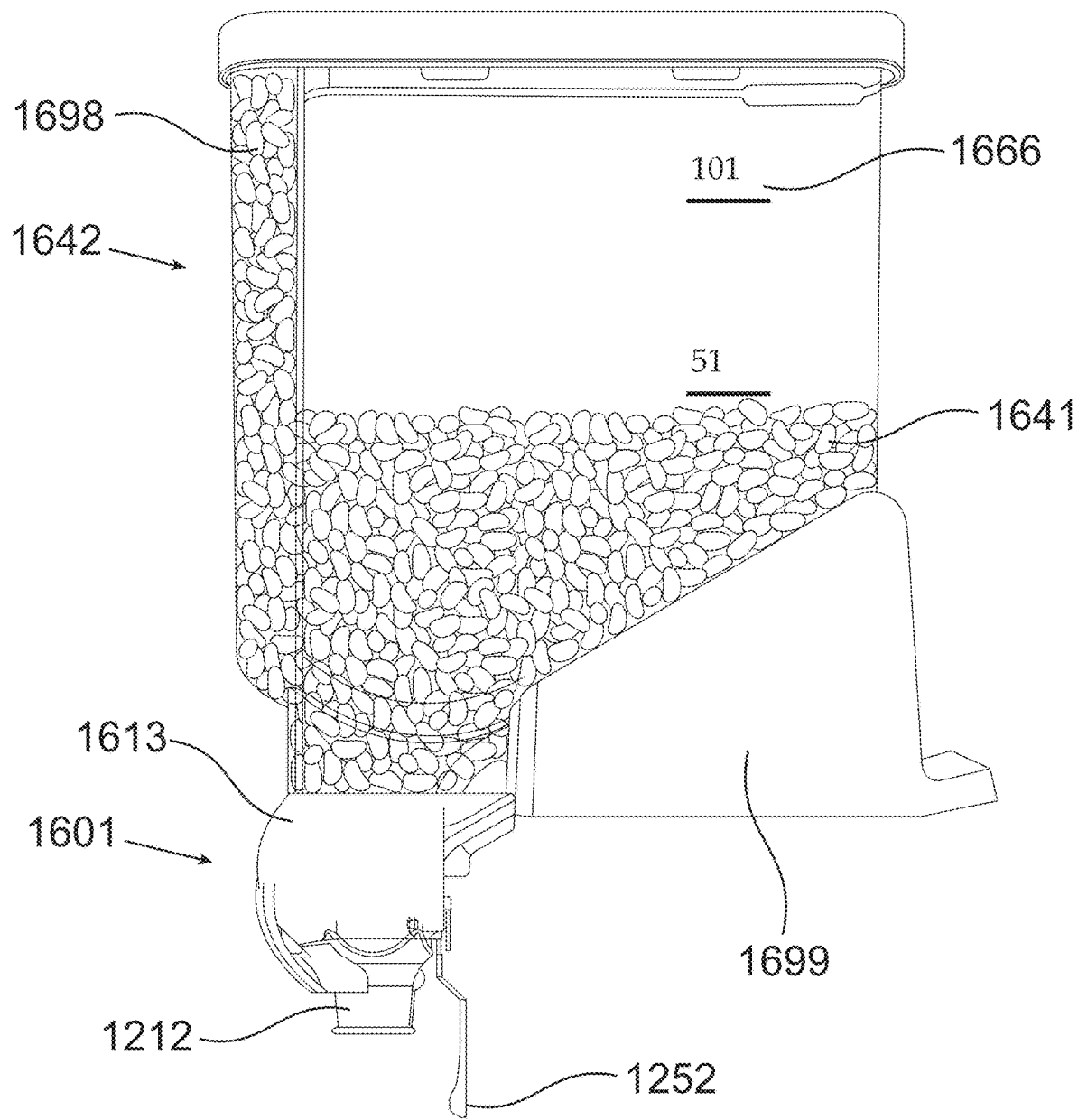
Figure 17:
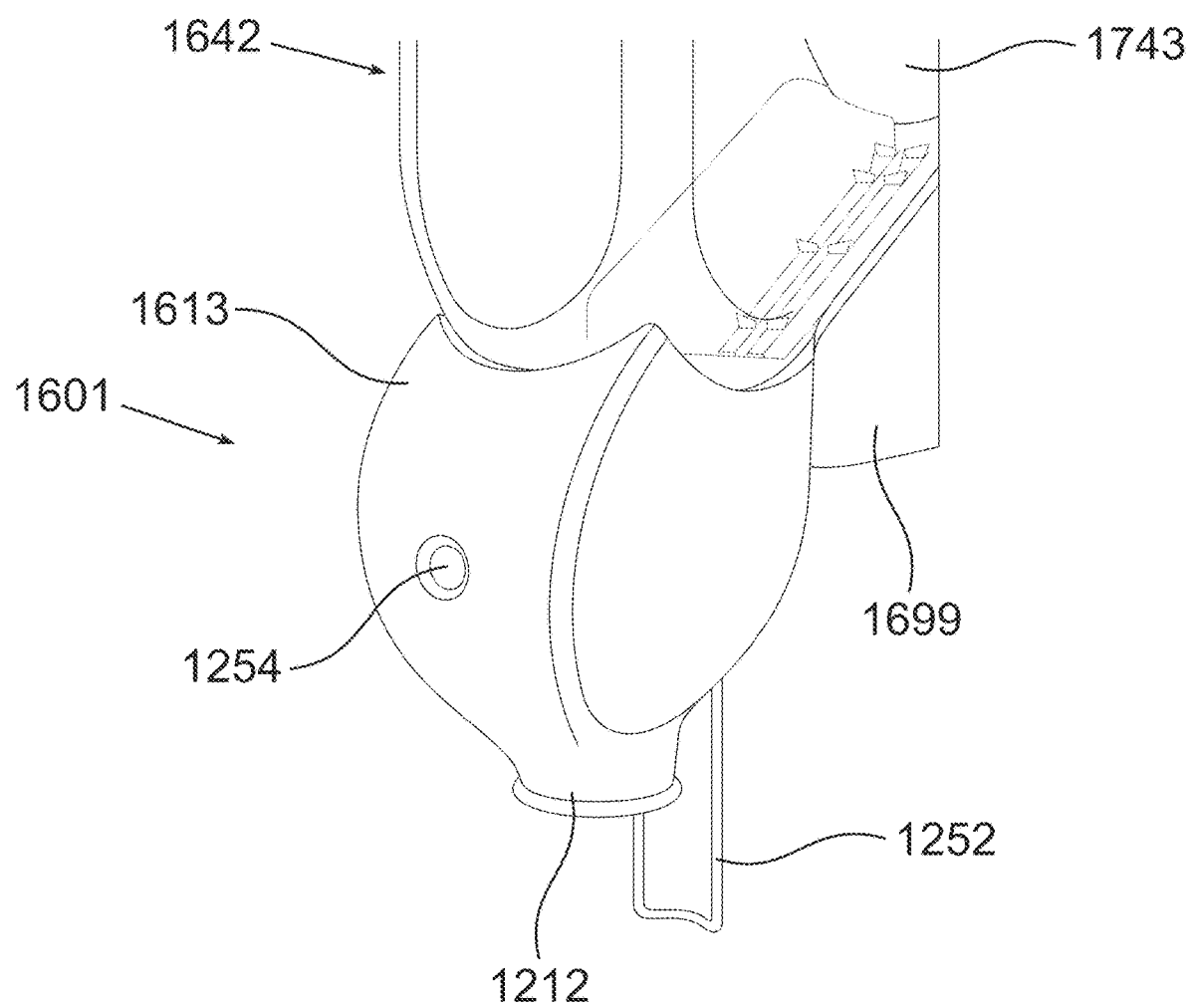

FIG. 17 illustrates a front perspective view of a dispenser having a large receptacle in accordance with an embodiment of the current invention. In some embodiments, the receptacle 1642 may include an extended 1743 section that extends outward to the sides beyond the valve assembly 1601. For example, the bottom of the the extended section 1743 may be inclined towards the valve assembly 1601 for example to funnel the contents of the receptacle 1642 towards the valve assembly 1601.

It is expected that during the life of a patent maturing from this application many relevant technologies will be developed and the scope of the terms is intended to include all such new technologies a priori.

As used herein the term "about" refers to ±15%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system to dispense dry goods comprising:
    a receptacle for the dry goods;
    a spout for dispensing the dry goods via gravity flow from said receptacle;
    a valve between the receptacle and the spout controlling flow of said dry goods from said receptacle;
    an actuator driving said valve between open and closed states;
    a controller configured to command said actuator to open and close said valve according to a program;
    an activator for said controller; and
    an adjustment interface for adjusting said program, wherein said adjustment interface includes an interface configured for inputting characteristics of the dry goods and an algorithm for deciding on a program for dispersing the dry goods, and
    wherein said interface is configured for inputting characteristics includes a camera for taking an image of the dry goods.

2. The system of claim 1, wherein said flow is a free flow valve.

3. The system of claim 1, where said activator is a sanitary activator.

4. The system of claim 1, wherein said adjustment interface includes a wireless receiver.

5. The system of claim 1, wherein said adjustment interface includes an application running on a personal computing device.

6. The system of claim 1, wherein said adjustment interface includes a manual regulator to adjust a maximum opening position.

7. The system of claim 1, wherein said adjustment interface includes a manual regulator to adjust an oscillation rate between a maximum open position and a minimum opening position.

8. The system of claim 1, wherein said adjustment interface includes a manual regulator to adjust an open time.

9. The system of claim 1, wherein said interface includes an image processing component for determining a shape and size of said dry goods from said image.

10. The system of claim 1, wherein said receptacle includes a fiducial marker.

11. The system of claim 1, further comprising a manual lever for activating dispensing manually.

12. The system of claim 1, further including an optical reader for reading a code specifying said program.

* * * * *